(12) United States Patent
Oklejas, Jr.

(10) Patent No.: US 8,529,761 B2
(45) Date of Patent: Sep. 10, 2013

(54) CENTRAL PUMPING AND ENERGY RECOVERY IN A REVERSE OSMOSIS SYSTEM

(75) Inventor: Eli Oklejas, Jr., Monroe, MI (US)

(73) Assignee: Fluid Equipment Development Company, LLC, Monroe, MI (US)

( * ) Notice: Subject to any disclaimer, the term of this patent is extended or adjusted under 35 U.S.C. 154(b) by 961 days.

(21) Appl. No.: 12/023,194

(22) Filed: Jan. 31, 2008

(65) Prior Publication Data
US 2008/0190848 A1 Aug. 14, 2008

Related U.S. Application Data

(60) Provisional application No. 60/901,204, filed on Feb. 13, 2007.

(51) Int. Cl.
*B01D 61/08* (2006.01)
*B01D 61/12* (2006.01)
*B01D 61/06* (2006.01)

(52) U.S. Cl.
USPC ........ 210/321.66; 210/258; 210/652; 210/87; 210/90; 210/739; 210/321.65

(58) Field of Classification Search
None
See application file for complete search history.

(56) References Cited

U.S. PATENT DOCUMENTS

| | | | |
|---|---|---|---|
| 659,930 A | 10/1900 | Kemble | |
| 893,127 A | 7/1908 | Barber | |
| 1,022,683 A | 4/1912 | Kienast | |
| 1,024,111 A | 4/1912 | Anderson | |
| 1,066,581 A | 7/1913 | Brown | |
| 2,715,367 A | 8/1955 | Kodet et al. | |
| 2,748,714 A | 6/1956 | Henry | |
| 3,160,108 A | 12/1964 | Sence | |

(Continued)

FOREIGN PATENT DOCUMENTS

| EP | 1508361 A | 2/2005 |
|---|---|---|
| GB | 2363741 A | 1/2002 |

(Continued)

OTHER PUBLICATIONS

El-Sayed E et al.: "Performance evaluation of two RO membrane configurations in a MSF/RO hybrid system". Desalination, Elsevier, Amsterdam, NL, vol. 128, No. 3, May 1, 2000, pp. 231-245, XP004204830; ISSN: 0011-9164; pp. 232-234; figure 1.

(Continued)

*Primary Examiner* — Krishnan S Menon
(74) *Attorney, Agent, or Firm* — Harness, Dickey & Pierce, P.L.C.

(57) ABSTRACT

A reverse osmosis system includes a plurality of feed pumps each having a feed pump input and a feed pump output, an input manifold in fluid communication with the feed pump inputs and a membrane feed manifold in fluid communication with the feed pump output. The system also includes a plurality of membrane chambers each in fluid communication with the membrane feed manifold and generating a permeate output and a brine output, each brine output in fluid communication with a brine manifold. The system further includes a plurality of booster devices each having a turbine portion with a turbine input in fluid communication with the brine manifold and a pump portion having a booster device pump input and a booster device pump output, each booster device pump output in fluid communication with the membrane feed manifold. The system includes a pump input manifold in fluid communication with the booster device pump input. The system also includes a medium pressure pump in fluid communication with the input manifold and the pump input manifold.

15 Claims, 5 Drawing Sheets

(56) References Cited

U.S. PATENT DOCUMENTS

| | | |
|---|---|---|
| 3,563,618 A | 2/1971 | Ivanov |
| 3,614,259 A | 10/1971 | Neff |
| 3,664,758 A | 5/1972 | Sato |
| 3,748,057 A | 7/1973 | Eskeli |
| 3,828,610 A | 8/1974 | Swearingen |
| 3,969,804 A | 7/1976 | Macinnes et al. |
| 3,999,377 A | 12/1976 | Oklejas et al. |
| 4,028,885 A | 6/1977 | Ganley et al. |
| 4,029,431 A | 6/1977 | Bachl |
| 4,187,173 A | 2/1980 | Keefer |
| 4,230,564 A | 10/1980 | Keefer |
| 4,243,523 A | 1/1981 | Pelmulder |
| 4,255,081 A | 3/1981 | Oklejas et al. |
| 4,288,326 A | 9/1981 | Keefer |
| 4,353,874 A | 10/1982 | Keller et al. |
| 4,432,876 A | 2/1984 | Keefer |
| 4,434,056 A | 2/1984 | Keefer |
| 4,472,107 A | 9/1984 | Chang et al. |
| RE32,144 E | 5/1986 | Keefer |
| 4,632,756 A | 12/1986 | Coplan et al. |
| 4,702,842 A | 10/1987 | Lapierre |
| 4,830,572 A | 5/1989 | Oklejas, Jr. et al. |
| 4,921,603 A | 5/1990 | Yen |
| 4,966,708 A | 10/1990 | Oklejas et al. |
| 4,973,408 A | 11/1990 | Keefer |
| 4,983,305 A | 1/1991 | Oklejas et al. |
| 4,997,357 A | 3/1991 | Eirich et al. |
| 5,020,969 A | 6/1991 | Mase et al. |
| 5,043,071 A | 8/1991 | Anselme et al. |
| 5,049,045 A | 9/1991 | Oklejas et al. |
| 5,082,428 A | 1/1992 | Oklejas et al. |
| 5,106,262 A | 4/1992 | Oklejas et al. |
| 5,132,015 A | 7/1992 | Down |
| 5,132,090 A | 7/1992 | Volland |
| 5,133,639 A | 7/1992 | Gay et al. |
| 5,154,572 A | 10/1992 | Toyoshima et al. |
| 5,320,755 A | 6/1994 | Hagqvist et al. |
| 5,338,151 A | 8/1994 | Kemmner et al. |
| 5,340,286 A | 8/1994 | Kanigowski |
| 5,401,395 A | 3/1995 | Hagqvist et al. |
| 5,482,441 A | 1/1996 | Permar |
| 5,499,900 A | 3/1996 | Khmara et al. |
| 5,647,973 A | 7/1997 | Desaulniers |
| 5,702,229 A | 12/1997 | Moss et al. |
| 5,819,524 A | 10/1998 | Bosley et al. |
| 5,951,169 A | 9/1999 | Oklejas et al. |
| 5,980,114 A | 11/1999 | Oklejas, Jr. |
| 6,007,723 A | 12/1999 | Ikada et al. |
| 6,017,200 A | 1/2000 | Childs et al. |
| 6,036,435 A | 3/2000 | Oklejas |
| 6,110,360 A | 8/2000 | Hart, Jr. |
| 6,110,375 A | 8/2000 | Bacchus et al. |
| 6,116,851 A | 9/2000 | Oklejas, Jr. |
| 6,120,689 A | 9/2000 | Tonelli et al. |
| 6,139,740 A | 10/2000 | Oklejas |
| 6,187,200 B1 | 2/2001 | Yamamura et al. |
| 6,190,556 B1 | 2/2001 | Uhlinger |
| 6,299,766 B1 | 10/2001 | Permar |
| 6,309,174 B1 | 10/2001 | Oklejas, Jr. et al. |
| 6,345,961 B1 | 2/2002 | Oklejas, Jr. |
| 6,468,431 B1 | 10/2002 | Oklelas, Jr. |
| 6,508,937 B1 | 1/2003 | Kawashima et al. |
| 6,589,423 B1 | 7/2003 | Chancellor |
| 6,709,599 B1 | 3/2004 | Rosenberger et al. |
| 6,713,028 B1 | 3/2004 | Oklejas, Jr. |
| 6,797,173 B1 | 9/2004 | Oklejas, Jr. |
| 6,881,336 B2 | 4/2005 | Johnson |
| 6,908,546 B2 | 6/2005 | Smith |
| 6,932,907 B2 | 8/2005 | Haq et al. |
| 6,936,140 B2 | 8/2005 | Paxton et al. |
| 7,077,962 B2 | 7/2006 | Pipes |
| 7,150,830 B1 | 12/2006 | Katsube et al. |
| 2003/0080058 A1 | 5/2003 | Kimura et al. |
| 2004/0104157 A1 | 6/2004 | Beeman et al. |
| 2004/0211729 A1 | 10/2004 | Sunkara et al. |
| 2006/0157409 A1 | 7/2006 | Hassan |
| 2006/0157410 A1 | 7/2006 | Hassan |
| 2006/0226077 A1 | 10/2006 | Stark |
| 2006/0254981 A1 | 11/2006 | Efraty |
| 2007/0056907 A1 | 3/2007 | Gordon |
| 2007/0199878 A1 | 8/2007 | Eisberg et al. |
| 2007/0289904 A1 | 12/2007 | Oklejas |
| 2007/0295650 A1 | 12/2007 | Yoneda et al. |
| 2008/0023410 A1 | 1/2008 | Efraty |
| 2008/0217222 A1 | 9/2008 | Efraty |

FOREIGN PATENT DOCUMENTS

| | | |
|---|---|---|
| WO | WO02/09855 A | 2/2002 |
| WO | WO2006/106158 A | 10/2006 |
| WO | WO2007/146321 A | 12/2007 |

OTHER PUBLICATIONS

Geisler P et al.: "Reduction of the energy demand for seawater RO with the pressure exchange system PES". Desalination, Elsevier, Amsterdam, NL, vol. 135, No. 1-3, Apr. 20, 2001, pp. 205-210, XP004249642; ISSN: 0011-9164; the whole document.

US 8,529,761 B2

CENTRAL PUMPING AND ENERGY RECOVERY IN A REVERSE OSMOSIS SYSTEM

RELATED APPLICATION

This application is a non-provisional application of provisional application 60/901,204, filed Feb. 13, 2007, the disclosure of which is incorporated by reference herein.

TECHNICAL FIELD

The present disclosure relates generally to reverse osmosis systems, and, more specifically, to a multi-stage reverse osmosis system having a centralized pumping source.

BACKGROUND

The statements in this section merely provide background information related to the present disclosure and may not constitute prior art.

Reverse osmosis systems are used to provide fresh water from brackish or sea water. A membrane is used that restricts the flow of dissolved solids therethrough.

Referring now to FIG. 1, a reverse osmosis system 10 is illustrated having a membrane array 12 that generates a permeate stream 14 and a brine stream 16 from a feed stream 18. The feed stream 18 typically includes brackish or sea water. A feed pump 20 coupled to a motor 22 pressurizes the feed stream 18 to the required pressure flow which enters the membrane array 12.

The permeate stream 14 is purified fluid flow at a low pressure. The brine stream 16 is a higher pressure stream that contains dissolved materials blocked by the membrane. The pressure of the brine stream 16 is only slightly lower than the feed stream 18. The membrane array 12 requires an exact flow rate for optimal operation. A brine throttle valve 24 may be used to regulate the flow through the membrane array 12. Changes take place due to water temperature, salinity, as well as membrane characteristics, such as fowling. The membrane array 12 may also be operated at off-design conditions on an emergency basis. The feed pumping system is required to meet variable flow and pressure requirements.

In general, a higher feed pressure increases permeate production and, conversely, a reduced feed pressure reduces permeate production. The membrane array 12 is required to maintain a specific recovery which is the ratio of the permeate flow to feed flow. The feed flow or brine flow likewise requires regulation.

A pretreatment system 21 may also be provided to pretreat the fluid into the membrane array 12. The pretreatment system 21 may be used to remove solid materials such as sand, grit and suspended materials. Each of the embodiments below including those in the disclosure may include a pretreatment system 21.

Referring now to FIG. 2, a system similar to that in FIG. 1 is illustrated with the addition of a feed throttle valve 30. Medium and large reverse osmosis plants typically include centrifugal-type pumps 20. The pumps have a relatively low cost and good efficiency, but they may generate a fixed pressure differential at a given flow rate and speed of rotation. To change the pressure/flow characteristic, the rate of pump rotation must be changed. One way prior systems were designed was to size the feed pump 20 to generate the highest possible membrane pressure and then use the throttle valve 30 to reduce the excess pressure to meet the membrane pressure requirement. Such a system has a low capital cost advantage but sacrifices energy efficiency since the feed pump generates more pressure and uses more power than is required for a typical operation.

Referring now to FIG. 3, another system for solving the pressure/flow characteristics is to add a variable frequency drive 36 to operate the motor 12 which, in turn, controls the operation of the feed pump 20. Thus, the feed pump 20 is operated at variable speed to match the membrane pressure requirement. The variable frequency drives 36 are expensive with large capacities and consume about three percent of the power that would otherwise have gone to the pump motor.

Referring now to FIG. 4, a system similar to that illustrated in FIG. 1 is illustrated using the same reference numerals. In this embodiment, a hydraulic pressure booster 40 having a pump portion 42 and a turbine portion 44 is used to recover energy from the brine stream 16. The pump portion 42 and the turbine portion 44 are coupled together with a common shaft 46. High pressure from the brine stream passes through the turbine portion 44 which causes the shaft 46 to rotate and drive the pump portion 42. The pump portion 42 raises the feed pressure in the feed stream 18. This increases the energy efficiency of the system. The booster 40 generates a portion of the feed pressure requirement for the membrane array 12 and, thus, the feed pump 20 and motor 22 may be reduced in size since a reduced amount of pressure is required by them.

Referring now to FIG. 5, a basic low-cost scheme for a large reverse osmosis plant 50 is illustrated using reference numerals similar to those of FIG. 1. In this embodiment, three reverse osmosis stages having three membranes 12a, 12b, and 12c are used together with three throttle valves 30a, 30b, and 30c. Three brine throttle valves 24a, 24b, and 24c are coupled to the brine output 16a, 16b, and 16c. The feed stream 18 is coupled to a feed manifold 52 which, in turn, is coupled to each of the feed throttle valves 30a-30c. Each throttle valve is used to provide feed fluid to each of the respective membrane 12a-12c. The brine stream 16a-16c passes through the brine throttle valves 24a-24c and into a brine manifold 54. The permeate streams are coupled to a permeate manifold 56.

In a large reverse osmosis plant 50, the objective is to use a feed pump with the largest available capacity to achieve the highest possible efficiency at the lowest capital cost per unit of capacity. The optimal capacity of a membrane array 12 is usually smaller than the pumps. Therefore, a single-feed pump 20 may be used to multiple supply membrane arrays 12. Such a configuration is called centralized feed pumping. Because each of the membranes has a variable pressure requirement, individual control using the throttle valves 30a-30c and 24a-24c may be used. However, using throttle valves wastes energy. Also, the individual membranes themselves may have their own pressure requirements due to the following level of the membranes which may vary over the membrane array.

Referring now to FIG. 6, a similar configuration to that of FIG. 5 is illustrated with the addition of a variable frequency drive used to drive the motor 22 and thus the pump 20. The variable frequency drive 60 is used to develop enough pressure at the pump 20 to satisfy the pressure requirements of the membrane arrays with the highest pressure requirement. The centralized pumping is partially offset by the difficulty of customizing the fixed discharge pressure of the feed pump to the variable pressure requirements of the multiple membrane arrays. Both of the configurations in FIGS. 5 and 6 require individual throttling and, thus, the energy efficiency is limited.

Referring now to FIG. 7, an embodiment similar to that illustrated in FIG. 4 may include an auxiliary brine nozzle 70 that is controlled by a brine valve 72. Normal operating conditions of a reverse osmosis plan may require making variations in the brine flow and pressure to keep the membrane array operating at optimal conditions. The brine valve 72 allows the brine flow to be increased to allow additional high pressure brine to pass into the turbine portion 44. If less brine flow is required, the auxiliary brine valve 72 may be closed. The auxiliary brine valve 72 may be manually closed or closed by a valve actuator.

Referring now to FIG. 8A, another prior art embodiment is illustrated that includes a feed manifold 80 that receives low pressure feed fluid. The feed fluid may be provided from a pretreatment system 21 as illustrated in FIG. 1. In this embodiment, a plurality of feed pumps 20 is illustrated. The components set forth may be provided in several redundant systems. The components may be referred to without their alphabetical designations. In particular, three pumps 20a-20c with corresponding motors 22a-22c are provided. The pumps 20 provide fluid at a high pressure to a high-pressure feed manifold 82. For servicing purposes, the pumps 20a-20c may be isolated and taken off line through the use of isolation valves 84 and 86. The isolation valve 84 may be positioned between the low pressure feed manifold 80 and the pump 20. The isolation valve 86 may be positioned between the pump and the high pressure manifold 82.

The pumps 20, the motors 22, and the isolation valves 84 and 86 may be referred to as the high pressure pump portion 90.

An isolation valve 92 may be positioned between the high pressure manifold 82 and the membrane 12. Each of the membrane arrays 12a-12h may include a corresponding input isolation valve 92a-h. A permeate isolation valve 94 may be positioned at the permeate outlet of the membrane array 12. A throttle valve 93 may also be disposed at each membrane downstream of isolation valve 92 to permit regulation of pressure for each membrane array 12. The throttle valves are labeled 93a-93h. An isolation valve 96 may be located at the high pressure brine output of the membrane array 12. Each of the respective membrane arrays may include a permeate isolation valve 94 and a brine isolation valve 96. The membrane arrays 12 and the isolation valves 92-96 may be referred to as the membrane array section 100 of the system.

The permeate outputs of the membranes 12 may all be in fluid communication with a low pressure permeate manifold 102 through the valves 94. The high pressure brine output of the membranes 12 may be in fluid communication with a high pressure brine manifold 104.

A plurality of flow work exchangers (FWE) 110 may be in fluid communication with the high pressure brine manifold 104. The flow work exchanger 110 will be further described below in FIG. 8B.

One output of the flow work exchanger 110 provides a lowered pressure from the brine output to a drain 112.

The flow work exchanger 110 also has an input in fluid communication with the low pressure feed manifold 80. Each fluid work exchanger 110 pressurizes the fluid received from the feed manifold 80 and provides a higher pressure to the high pressure feed manifold 82. The flow work exchanger 110 thus draws feed fluid from the low pressure feed manifold 80 and increases the pressure therein which is discharged into the higher pressure feed manifold 82. Thus, the combination of the output of the pump portion 90 and the output of the energy recovery portion 120 combine to provide the feed flow for the membrane portion 100.

The flow work exchanger 110 thus has two fluid input and two fluid outputs. The fluid input to the flow work exchanger 110 from the brine manifold 104 may include an isolation valve 122. The fluid input to the flow work exchanger 110 from the low pressure feed manifold 80 may include an isolation valve 124. The brine output of the flow work exchanger 110 may include an isolation valve 126. The high pressure output of the flow work exchanger 110 may include an isolation valve 128.

The isolation valves 122, 124, 126 and 128 allow the flow work exchanger 110 to be removed from service without interrupting the operation of the system. In the configuration of FIG. 8, the flow work exchanger 110 can only deliver a feed flow rate that is about equal to the brine flow rate. There is no possibility to increase or decrease the feed flow relative to the brine flow.

Referring now to FIG. 8B, the flow work exchanger 110 is illustrated in further detail. The flow work exchanger 110 may include electrical control equipment 130, booster pumps 133 and other equipment 137, 138. The other equipment may include pistons, valves and pressure vessels. The various components within the flow work exchanger 110 may be connected in various ways depending on the type of components used.

Improving the efficiency of reverse osmosis systems to reduce energy consumption is a desirable goal.

SUMMARY

The present disclosure provides a reverse osmosis system that is cost effective to control variability in the system in a convenient and efficient manner.

In one aspect of the disclosure, a reverse osmosis system includes a plurality of feed pumps each having a feed pump input and a feed pump output, an input manifold in fluid communication with the feed pump inputs and a membrane feed manifold in fluid communication with the feed pump output. The system also includes a plurality of membrane chambers each in fluid communication with the membrane feed manifold and generating a permeate output and a brine output, each brine output in fluid communication with a brine manifold. The system further includes a plurality of booster devices each having a turbine portion with a turbine input in fluid communication with the brine manifold and a pump portion having a booster device pump input and a booster device pump output. Each booster device pump output is in fluid communication with the membrane feed manifold. The system includes a pump input manifold in fluid communication with the booster device pump input. The system also includes a medium pressure pump in fluid communication with the input manifold and the pump input manifold.

In another aspect of the disclosure, a reverse osmosis system includes a plurality of feed pumps each having a feed pump input and a feed pump output and an input manifold in fluid communication with the feed pump inputs. The input manifold has a first pressure therein. The system also has a membrane feed manifold in fluid communication with the feed pump output. The membrane feed manifold has a second pressure greater than the first pressure. The system also has a plurality of membrane chambers each in fluid communication with the membrane feed manifold and generates a permeate output and a brine output. Each brine output in fluid communication with a brine manifold. A plurality of booster devices each has a turbine portion with a turbine input in fluid communication with the brine manifold and a pump portion having a booster device pump input and a booster device pump output. Each booster device pump output is in fluid communication with the membrane feed manifold. The system also includes a pump input manifold in fluid communication with the booster device pump input. The system also includes a medium pressure pump in fluid communication with the input manifold and the pump input manifold. The medium pressure pump generates a third pressure in the pump input manifold greater than the first pressure but less than the second pressure.

In a further aspect of the disclosure, a method of operating a reverse osmosis system with a membrane chamber in communication with a membrane feed manifold and generating a permeate output and a brine output in fluid communication with a brine manifold, and booster devices each having a turbine portion in fluid communication with the brine manifold and a pump portion in fluid communication with a pump input manifold includes pumping feed fluid having a first pressure in an input manifold to a second pressure greater than the first pressure into the membrane feed manifold, pumping feed fluid having the first pressure in the input manifold to a third pressure greater than the first pressure but less than the second pressure into a pump input manifold, communicating feed fluid at the third pressure to the pump portions of each booster device, increasing the second pressure in the membrane feed manifold using the pump portions of each booster device in response to a brine pressure in a brine manifold.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
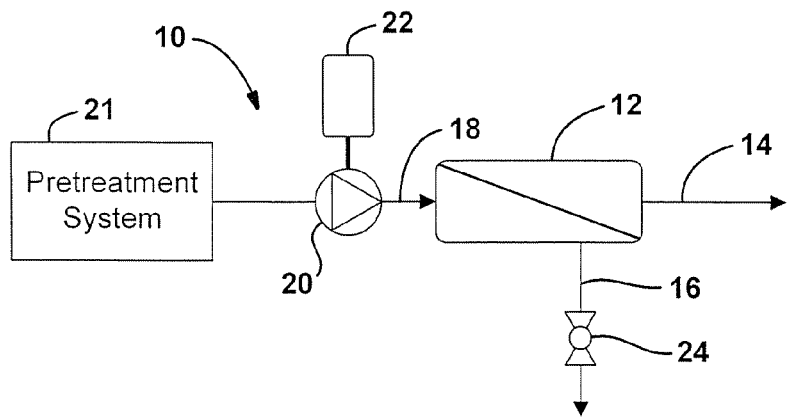
FIG. 1 is a schematic view of a prior reverse osmosis system.
Figure 2:
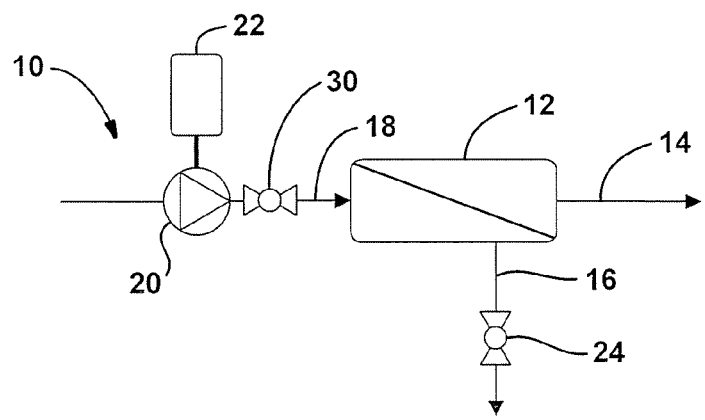
FIG. 2 is a schematic view of an alternate prior art reverse osmosis system.
Figure 3:
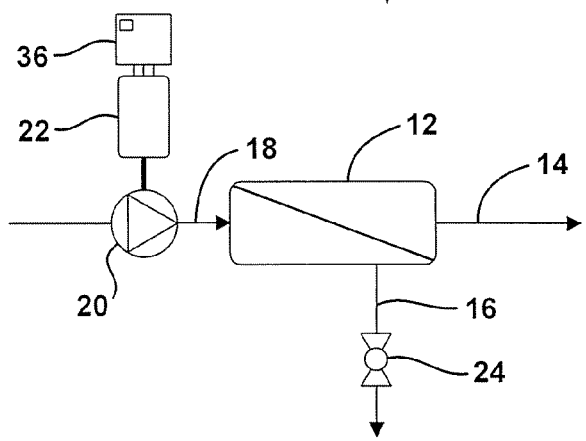
FIG. 3 is a schematic view of another prior art of a reverse osmosis system.
Figure 4:
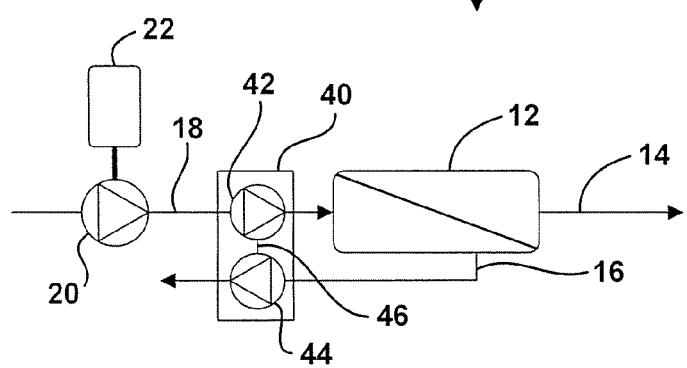
FIG. 4 is another schematic view of a prior art configuration of a reverse osmosis system.
Figure 5:
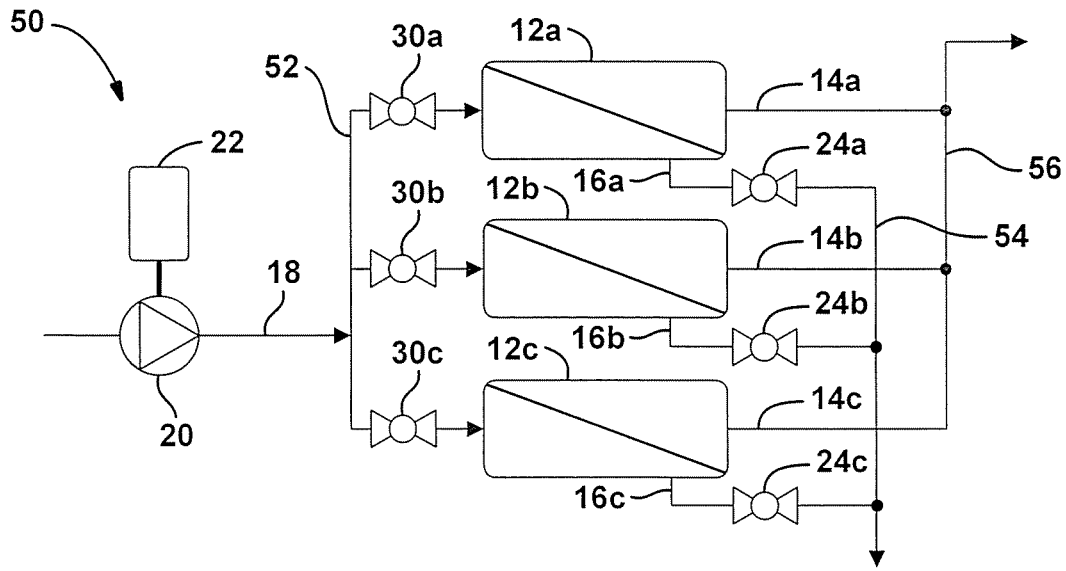
FIG. 5 is another schematic view of a prior art configuration of a reverse osmosis system.
Figure 6:
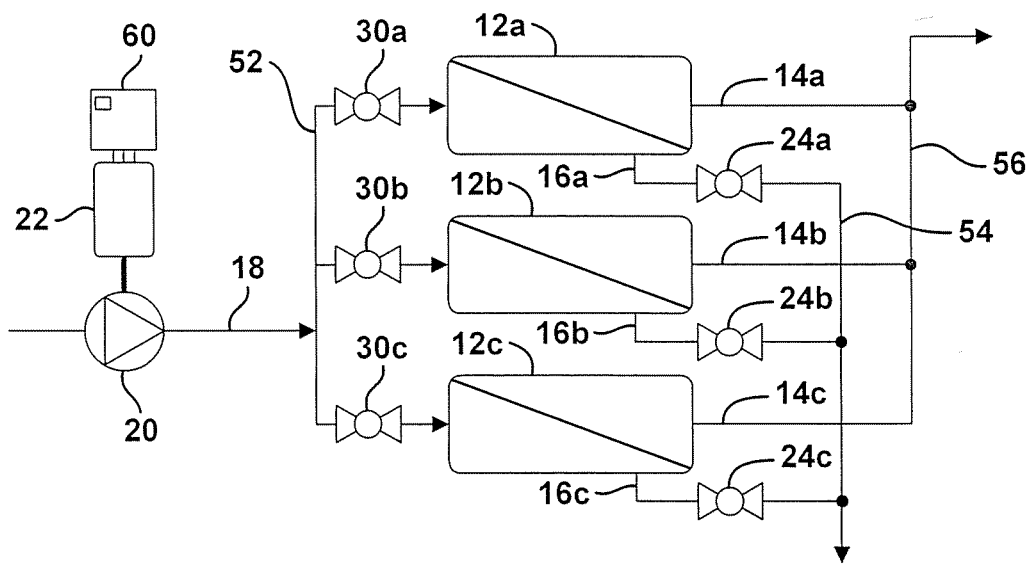
FIG. 6 is another schematic view of a prior art configuration of a reverse osmosis system.
Figure 7:
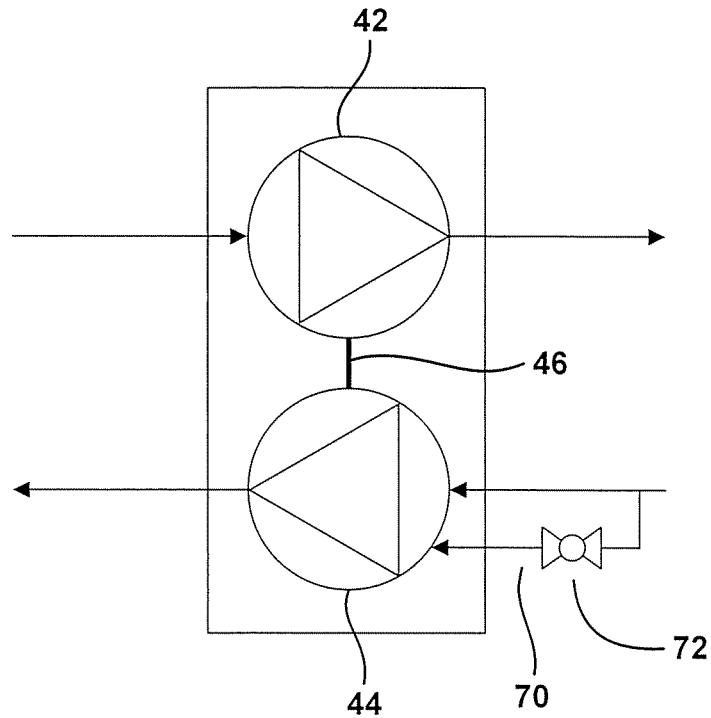
FIG. 7 is a schematic view of a hydraulic pressure booster according to the prior art.

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

Figure 8B:
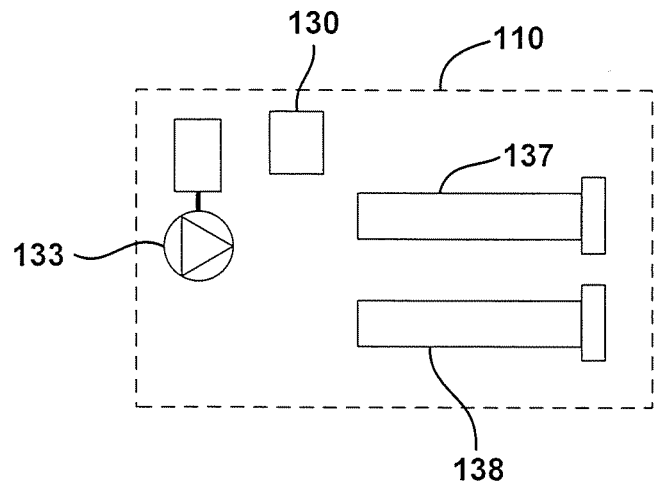
FIG. 8B is a detailed diagrammatic view of the flow work exchanger of FIG. 8A according to the prior art.
Figure 8A:
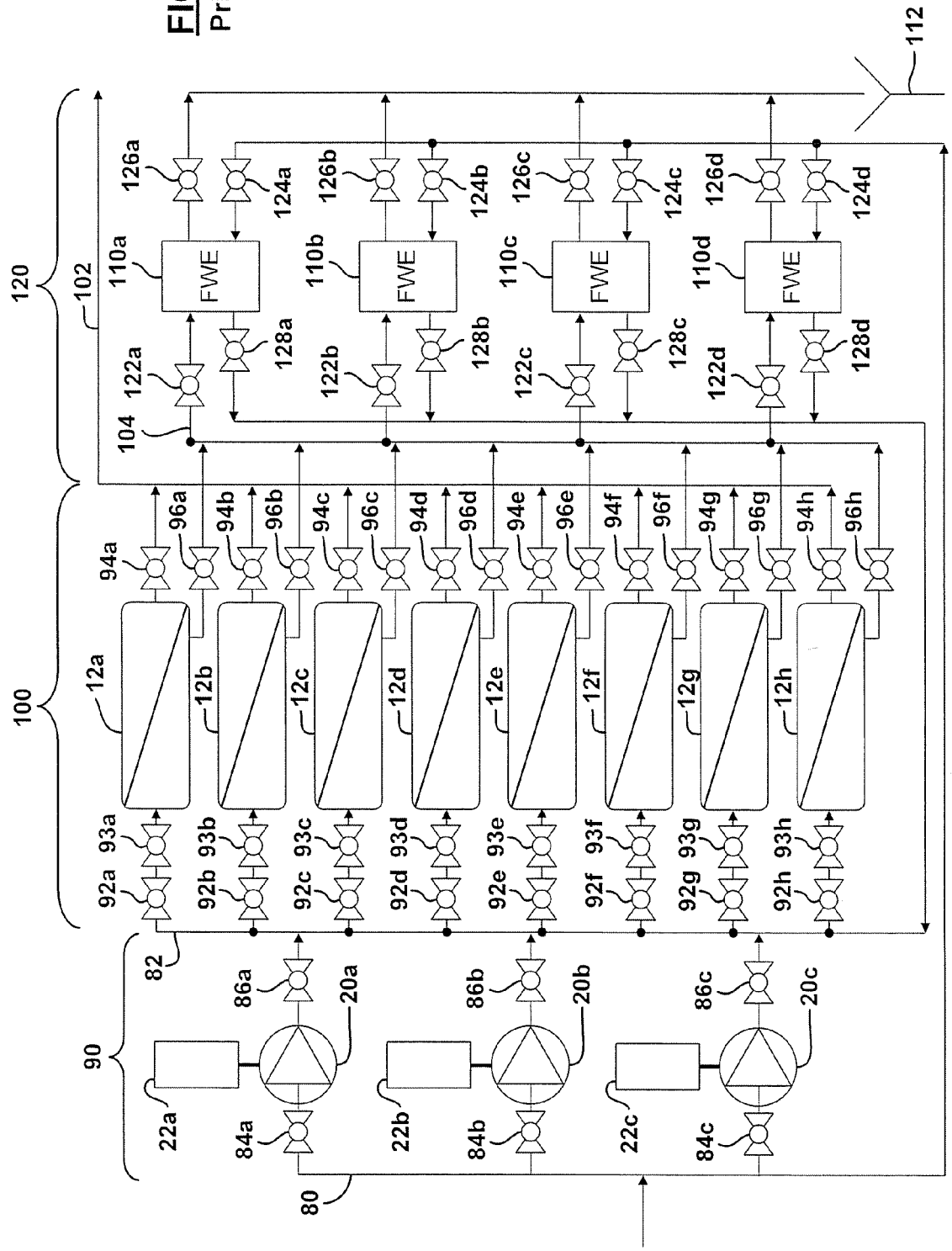
FIG. 8A is a schematic view of a multistage membrane reverse osmosis system according to the prior art.
Figure 9:
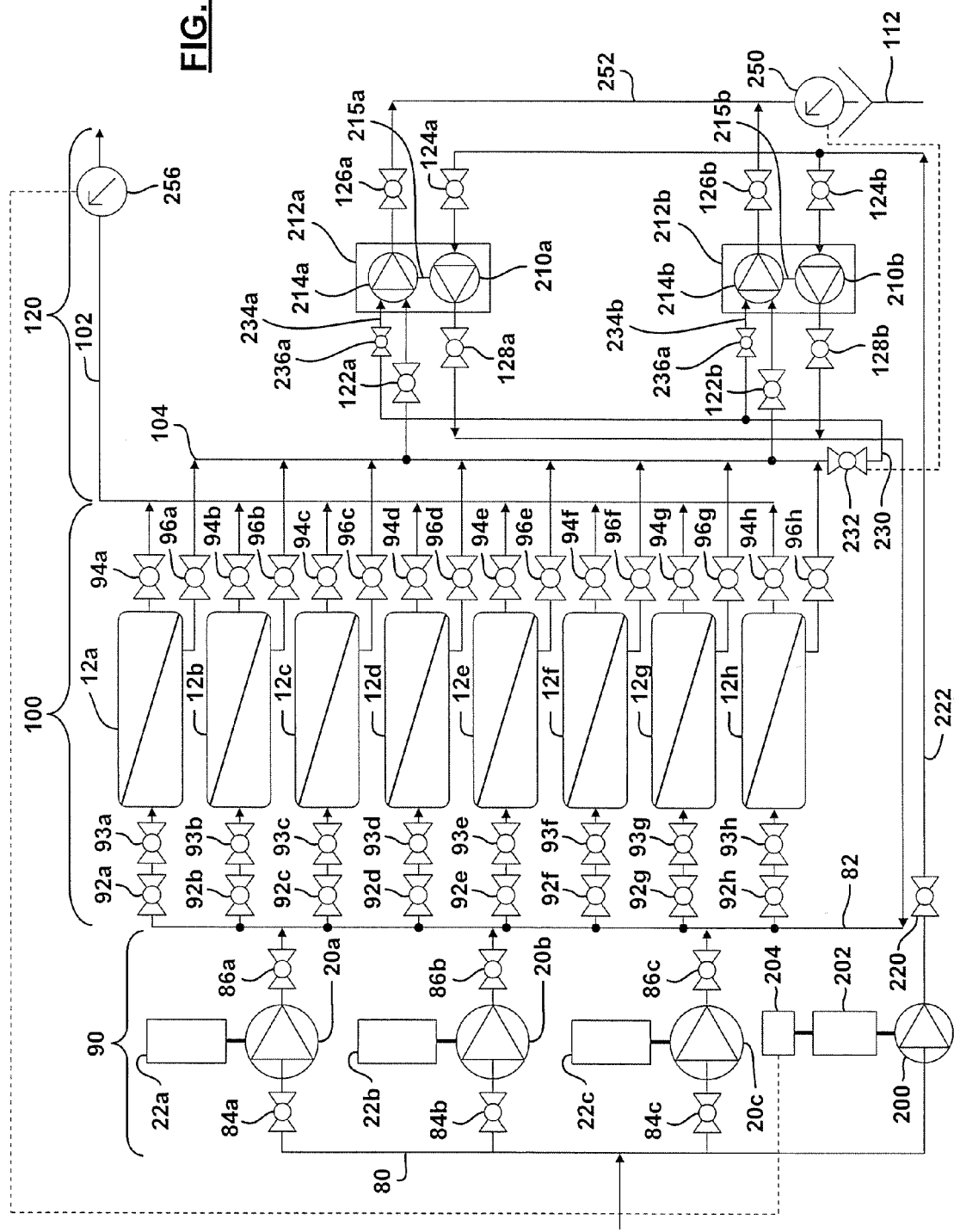
FIG. 9 is a schematic view of a reverse osmosis system according to the present disclosure.

Referring now to FIG. 9, an embodiment similar to FIG. 8 with various components is illustrated. The same reference numerals are used for the same components. In this embodiment, isolation valves 92, 94 and 96 and throttle valves 93 may be associated with the membrane arrays 12 and isolation valves 84 and 86 may be associated with the pumps 20 in a similar manner to that described above. The plurality of feed pumps 20 and the membrane arrays 12 may also be configured the same as in FIG. 8.

In this embodiment, a medium pressure pump 200 driven by a motor 202, which in turn may be driven by a variable speed drive 204, is disposed within the low pressure feed manifold 80. A pump input manifold 222 may have an increased pressure from the low pressure feed manifold 80. In addition to or alternatively from the variable speed drive 204, a throttle valve 220 may be provided to regulate the pressure within the input manifold. The medium pressure pump 200 may ultimately be used to change the pressure at the feed manifold 82.

A booster device 212 used for energy recovery may be used instead of the FWE of FIG. 8A. Two booster devices are illustrated. Each booster device 212 may include a pump portion 210 and a turbine portion 214. The pump portion 210 may be in fluid communication with the pump 200 through the pump input manifold. The pump input manifold 222 has feed fluid therein. The turbine portion 214 has an input in fluid communication with the brine manifold 104 and a low pressure output in communication with the drain 112. The turbine portion 214 and pump portion may be coupled together with a common shaft 215 (or other coupling mechanism) so energy in the high pressure brine stream is captured to drive the pump portion 210.

The brine manifold 104 may be in fluid communication with an auxiliary brine manifold 230. The auxiliary brine manifold 230 and the brine manifold 104 may have a brine control valve 232 therebetween. The pressure in the auxiliary brine manifold 230 may be controlled and regulated using the brine control valve 232. This may be done manually or by actuator. The auxiliary brine manifold 230 is in fluid communication with the turbine portions 214 through an auxiliary nozzle or port 234. An isolation valve 236A may be used to regulate the flow and isolate or turn off the input to the auxiliary port 234A.

In operation, the medium pressure pump 200 pressurizes the feed from the low pressure manifold 80 to an intermediate value higher than the feed input manifold pressure 80. The intermediate value may be approximately or less than 25 percent of the membrane pressure. The medium pressure feed fluid is provided to the energy recovery portion 120. More specifically, the feed fluid is provided to the feed pump 210 through the pump input manifold 222. The pump portion 210 increases the pressure. The turbine portion 214 of the booster device 212 recovers the energy from the high pressure brine manifold 104 and increases the pressure of the feed fluid. Energy from the brine manifold 104 is converted to drive the pump portion 210. The pressure of the output of the pump portion 210 may increase and allow variance to the pressure in the membrane manifold 82. Changing the pressure in the manifold 82 may be done by controlling the VFD 204 in communication with the motor 202 and pump 200.

The auxiliary brine manifold 230 may be used to provide uniform pressure to each auxiliary nozzle 234 of booster devices 212. Each booster device 212 may operate at the same brine flow and pressure and thus share in the hydraulic load. One adjustment of the brine control valve 232 allows the brine flow to each booster device to be adjusted. This eliminates individual valve actuators and control valves which reduces the overall cost of the system. The isolation valves 122, 124, 126, 128 and 236 allow the removal of a booster device without interruption to the system. It should be noted that the maximum flow through the auxiliary brine manifold 230 may be less than a predetermined amount of the flow in the brine manifold 104 such as 15%.

The booster device 212 may be driven to provide a variable speed flow rate. However, the amount of pressure boost generated by the feed pump portion 210 may likewise vary. A high feed flow decreases the pressure boost and likewise a low feed flow allows a higher pressure boost. Therefore, the feed flow through the pump portion can be controlled by regulating the pressure of the input manifold 222 after the pump 200. Thus, the control of the feed flow may be independent of the brine flow. The feed flow through the pump portion 210 may be varied over a range of about 25 percent through adjustment of pressure at the pump 200.

Another way in which to control the system is to use a brine flow meter 250 on the low pressure brine manifold 252 leading to drain 112. The flow meter generates a brine flow signal to a valve actuator on valve 232 to regulate brine flow. A permeate flow meter 256 on the low pressure permeate manifold 102 generates a permeate flow signal to VFD 204 to regulate permeate production. In this way, only two flow meters are used to regulate the permeate production and brine flow because the feed flow equals the brine flow plus the permeate flow. Whether the system just has one train or twenty trains, the control scheme is the same. Also, if a membrane array or a feed pump is taken out of service, the resulting changes in brine and permeate flows generate a response to increase speed of medium pressure pump 200 and/or open control valve 232 to restore permeate and brine flows to the design values without any intervention required by the operating staff.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A reverse osmosis system comprising:
   a plurality of feed pumps each having a feed pump input and a feed pump output;
   an input manifold in fluid communication with the feed pump inputs, said input manifold having a first pressure;
   a membrane feed manifold in fluid communication with the feed pump output, said membrane feed manifold having a second pressure greater than the first pressure;
   a plurality of membrane chambers, each in fluid communication with the membrane feed manifold and generating a permeate output and a brine output, each brine output in fluid communication with a brine manifold;
   a plurality of booster devices, each having a turbine portion having a turbine input in fluid communication with the brine manifold and a pump portion having a booster device pump input and a booster device pump output, each booster device pump output in fluid communication with the membrane feed manifold;
   a pump input manifold in fluid communication with the booster device pump input;
   a permeate manifold in fluid communication with each permeate output of the plurality of membrane chambers;
   a permeate flow meter generating a permeate flow signal; and
   a medium pressure pump coupled to a motor and variable speed drive, said medium pressure pump communicating fluid from the input manifold to the pump input manifold, said variable speed drive controlling the medium pressure pump to generate a variable third pressure in the pump input manifold greater than the first pressure and less than the second pressure based on the permeate flow signal.

2. A reverse osmosis system as recited in claim 1 further comprising an auxiliary brine manifold in fluid communication with the brine manifold, each turbine portion comprising an auxiliary input nozzle in fluid communication with the auxiliary brine manifold through a brine control valve.

3. A reverse osmosis system as recited in claim 2 wherein the medium pressure pump is disposed between the pump input manifold and the input manifold.

4. A reverse osmosis system as recited in claim 1 further comprising an auxiliary brine manifold in fluid communication with the brine manifold, each turbine portion comprising an auxiliary input nozzle in fluid communication with the auxiliary brine manifold.

5. A reverse osmosis system as recited in claim 4 wherein said brine manifold has a first flow rate and the auxiliary brine manifold has a second flow rate up to about 15 percent of the first flow rate.

6. A reverse osmosis system as recited in claim 1 further comprising a motor coupled to the medium pressure pump.

7. A reverse osmosis system as recited in claim 6 further comprising a variable speed drive controlling the motor to generate the variable third pressure.

8. A reverse osmosis system as recited in claim 1 further comprising an auxiliary brine manifold in fluid communication with the brine manifold, each turbine portion comprising an auxiliary input nozzle in fluid communication with the auxiliary brine manifold through a brine control valve, said reverse osmosis system further comprising a low pressure brine manifold in fluid communication with a turbine portion output of each of the plurality of booster devices and a low pressure brine flow meter generating a brine flow signal, the brine control valve controlled in response to the brine flow signal.

9. A reverse osmosis system as recited in claim 1 wherein the third pressure is about 25 percent of the second pressure.

10. A reverse osmosis system as recited in claim 1 wherein the third pressure is less than 25 percent of the second pressure.

11. A reverse osmosis system as recited in claim 1 wherein a feed flow through the membrane feed manifold is controlled independently of a brine flow in the brine manifold.

12. A reverse osmosis system comprising:
    a plurality of feed pumps each having a feed pump input and a feed pump output;
    an input manifold having a first pressure in fluid communication with the feed pump inputs;
    a membrane feed manifold having a second pressure in fluid communication with the feed pump output;
    a plurality of membrane chambers, each in fluid communication with the membrane feed manifold and generating a permeate output and a brine output, each brine output in fluid communication with a brine manifold;
    a plurality of booster devices, each having a turbine portion having a turbine input in fluid communication with the brine manifold and a pump portion having a booster device pump input and a booster device pump output, each booster device pump output in fluid communication with the membrane feed manifold;
    a pump input manifold in fluid communication with the booster device pump input;

a permeate manifold in fluid communication with each permeate output of the plurality of membrane chambers;

a permeate flow meter generating a permeate flow signal; and a medium pressure pump coupled to a motor and variable speed drive, said medium pressure pump communicating fluid from the input manifold to the pump input manifold, said variable speed drive controlling the medium pressure pump to generate a variable third pressure in the pump input manifold greater than the first pressure and less than the second pressure based on the permeate flow signal.

13. A reverse osmosis system as recited in claim 12 further comprising an auxiliary brine manifold in fluid communication with the brine manifold, each turbine portion comprising an auxiliary input port in fluid communication with the auxiliary brine manifold.

14. A reverse osmosis system as recited in claim 12 further comprising an auxiliary brine manifold in fluid communication with the brine manifold, each turbine portion comprising an auxiliary input port in fluid communication with the auxiliary brine manifold through a brine control valve.

15. A reverse osmosis system as recited in claim 14 further comprising a low pressure brine manifold in fluid communication with a turbine portion output of each of the plurality of booster devices and a low pressure brine flow meter generating a brine flow signal controlling the brine control valve.

* * * * *